USOO5650681A

United States Patent [19]
DeLerno

[11] Patent Number: 5,650,681
[45] Date of Patent: Jul. 22, 1997

[54] ELECTRIC CURRENT GENERATION APPARATUS

[76] Inventor: Charles Chaille DeLerno, 1736 Audubon St., New Orleans, La. 70118

[21] Appl. No.: 406,683

[22] Filed: Mar. 20, 1995

[51] Int. Cl.$^6$ .................................................. H02K 21/04
[52] U.S. Cl. ........................... 310/164; 310/10; 310/12; 310/13; 310/14; 310/54
[58] Field of Search ................................ 310/164, 54, 10, 310/12, 13, 14, 267

[56] References Cited

U.S. PATENT DOCUMENTS

| | | | |
|---|---|---|---|
| 3,634,704 | 1/1972 | Stix | 310/10 |
| 3,935,503 | 1/1976 | Ress | 315/111 |
| 4,010,396 | 3/1977 | Ress et al. | 313/231 |
| 4,087,771 | 5/1978 | Kirtley, Jr. et al. | 310/184 |
| 4,376,901 | 3/1983 | Pettibone et al. | 310/10 |
| 4,547,713 | 10/1985 | Langley et al. | 318/254 |
| 4,806,810 | 2/1989 | Hernden | 310/89 |
| 5,030,863 | 7/1991 | Yoshimura et al. | 310/52 |
| 5,175,462 | 12/1992 | Yoshino et al. | 310/164 |
| 5,334,898 | 8/1994 | Skybyk | 310/268 |
| 5,334,899 | 8/1994 | Skybyk | 310/268 |

*Primary Examiner*—Steven L. Stephan
*Assistant Examiner*—Elvin G. Enad
*Attorney, Agent, or Firm*—George A. Bode; Michael L. Hoelter

[57] ABSTRACT

An electric generator for generating an electrical current that comprises a continuous housing containing equally spaced-apart magnets that pass the continuous housing through the center of a plurality of individual coils in a concentric larger outer housing. To enhance the current generated, a plate is inserted between adjacent coils in the larger housing and the magnets are arranged so that opposite poles are adjacent each other. To further increase current generation, the coils may be cooled so as to reduce any resistance therein.

20 Claims, 5 Drawing Sheets

ELECTRIC CURRENT GENERATION APPARATUS

BACKGROUND OF THE INVENTION

1. Field of the Invention

This invention pertains to the generation of electric current by a magnetic assembly and, more particularly, to such generation by rotating a continuous array of magnets through a series of annularly arranged coils.

2. General Background

Many devices and methods exist which utilize magnets or magnetic energy to perform specific tasks or work. Typical examples of this include U.S. Pat. No. 3,178,625 issued to R. H. Pintell which utilizes an electromagnetic assembly to rotate a shaft. This electromagnetic assembly can also be adapted to produce a current whose frequency and/or magnitude can vary from the fixed-frequency alternating input voltage source.

Another use of magnetics is shown in U.S. Pat. No. 3,665,227 issued to R. W. Busch which discloses an electric motor that converts electromagnetic energy into rotational mechanical energy. Annular magnets 16 and 18, which are arcuate or "C-shaped" in cross section, are formed so as to permit a series of small coils 28 and 30 to pass therethrough. These coils 28 and 30 are connected to shaft 20 which is rotated in response to the interaction between the magnets and the coils.

U.S. Pat. No. 3,992,132 issued to J. W. Putt discloses a first series of fixed magnets that are symmetrically arranged about a central shaft 4. A second rotatable magnet is secured to this shaft which is rotated by the attraction/repulsion of this second magnet with these first magnets. The polarities of these first and second magnets are such that the forces of magnetic attraction in one direction are substantially equal to the forces of magnetic repulsion in the opposite parallel direction. Consequently, the rotation of this shaft is maintained with minimum energy requirements.

U.S. Pat. No. 4,214,178 issued to R. E. Tippner pertains to a motor that incorporates a series of solenoids radially spaced from a central shaft. An annular armature secured to this shaft supports a series of magnetizable and non-magnetizable elements about its outer circumference. The selective activation of the solenoids and their effect upon the magnetizable elements causes the armature to rotate.

U.S. Pat. No. 4,305,024 issued to S. Kuroki discloses a magnetic motor having a plurality of electromagnets that are connected to an excitation circuit and which are spaced about a rotor assembly. The rotor assembly is constructed of a plurality of permanent magnets such that the rotor assembly is rotated by the selective activation of the electromagnets and their resulting repulsive forces upon the permanent magnets of the rotor assembly.

U.S. Pat. No. 4,571,528 issued to Magna Motive Industries, Inc., on the application of D. W. McGee, et al., pertains to an electromagnetic rotary motor having a plurality of permanent magnets secured to both a stator and a rotor. The magnetic field of each rotor magnet interacts with the magnetic field of the stator magnets through either repulsion or attraction. Such interaction of the magnets between the stator and the rotor causes the rotor to rotate.

U.S. Pat. No. 4,613,779 issued to S. A. Meyer discloses an electrical pulse generator incorporating a plurality of electromagnets that are spatially arranged about the inner and outer circumference of a base. A magnetic field is thus created between these inner and outer magnets and a coil is inserted therein. This coil is rotated to traverse this field, thereby inducing a voltage/current potential in the coil winding.

U.S. Pat. No. 3,935,487 issued to L. C. Czerniak and Japanese Patent No. 57-151280 disclose magnets generating forces to drive a motor.

While each of these patents may be suitable for their intended purpose, not one of them discloses a manner of inducing a current into a conducting medium by the rotation of magnets within annular coils. It is thus an object of the present invention to generate electric current by the rotation of a continuous array of magnets through a conducting medium.

It is a further object of the present invention to generate such current while avoiding actual physical contact between the stationary coils and the rotating magnets.

Yet another object of the present invention is to permit the use of one or more windings or coils depending on the magnitude of current to be generated.

Still another object of the present invention is to position the coils at a right angle to the magnetic flux lines generated by the magnets rotating therethrough.

A further object of the present invention is to cause the magnets to rotate about a common axis and to position the coils so as to surround this same axis. These and other objects and advantages of this invention will become obvious upon further investigation.

SUMMARY OF THE PRESENT INVENTION

The preferred embodiment of the apparatus of the present invention solves the aforementioned problems in a straightforward and simple manner. What is disclosed is an electric current generator having a plurality of hollow, closely spaced, arcuate outer housings arranged in the shape of a torus. These outer housings each have a generally circular cross-section that is centered about a generally annular axis. A plurality of individual coils are spaced arcuately within each arcuate outer housing with each such coil being centered about the annular axis of the housing. Intermediate each pair of these coils is provided an individual plate; also, both these coils and these plates have central openings therein that are concentric with the annular axis of the outer housing, thus defining a central bore through each housing. Extending within these central openings or bores is a continuous hollow annular inner housing also in the shape of a torus and also having a generally circular cross-section centered about the annular axis. Within such continuous inner housing is a plurality of individual magnets that are generally equally spaced therein. A drive assembly drives or passes this continuous inner housing, and hence the magnets, through the openings in the coils positioned within the outer housings, thereby creating an electric field for the generation of current.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
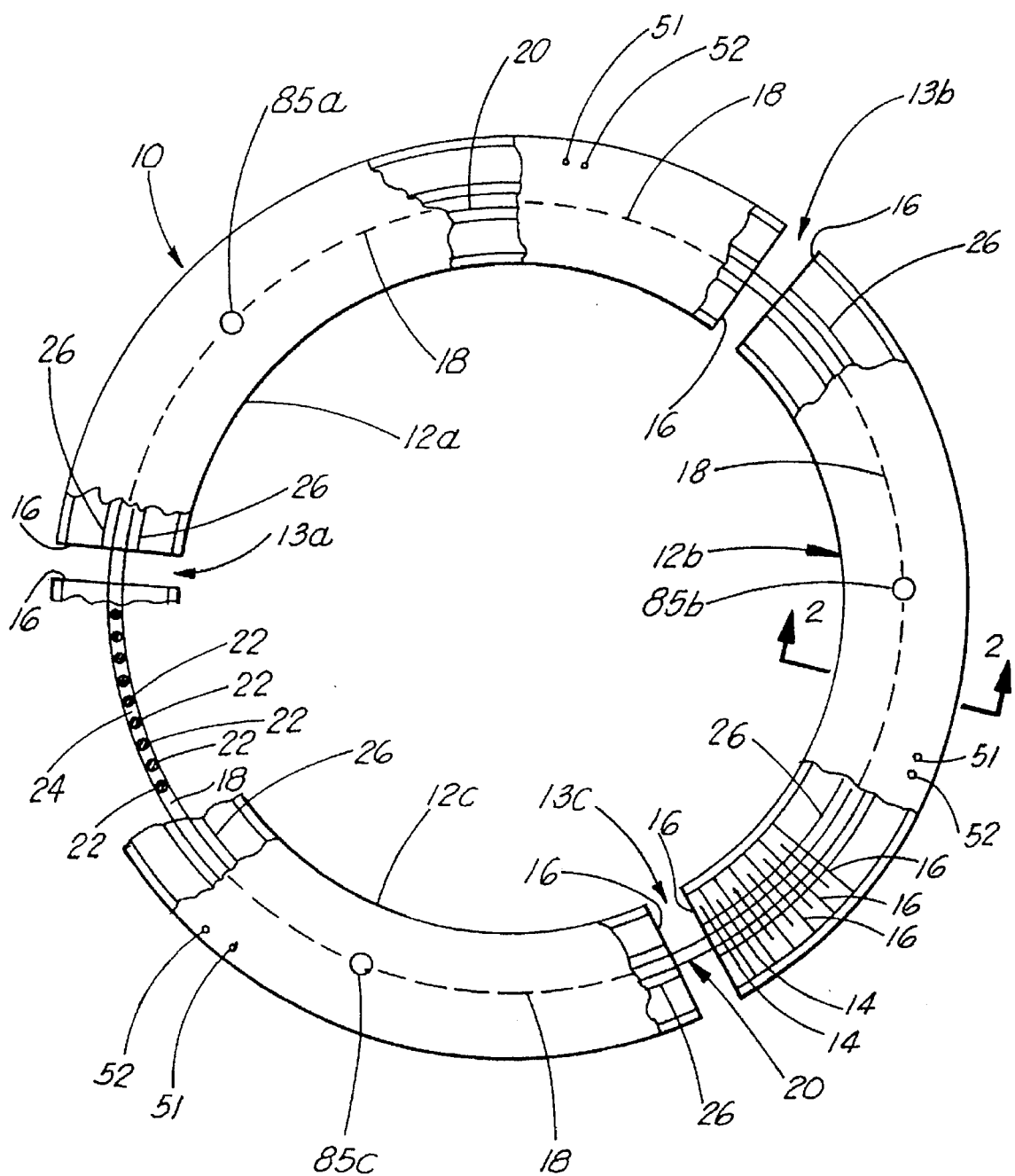
FIG. 1 is a top plan view of the preferred embodiment of the apparatus of the preferred invention without its drive means and which has been partially broken away to show details of construction.
Figure 2:
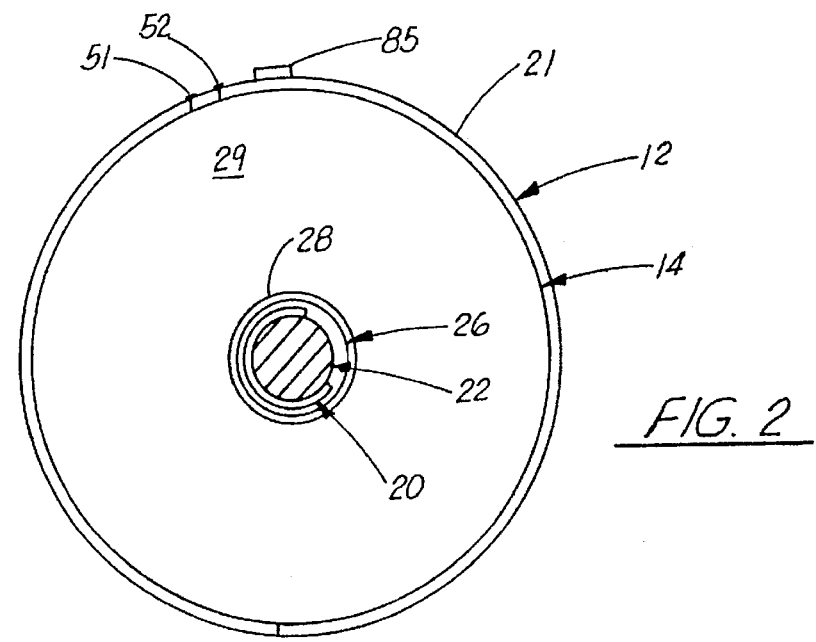
FIG. 2 is a cross-sectional view of the embodiment of FIG. 1, taken along Lines 2—2 of FIG. 1, with a portion of the inner housing partially broken away.
Figure 3:
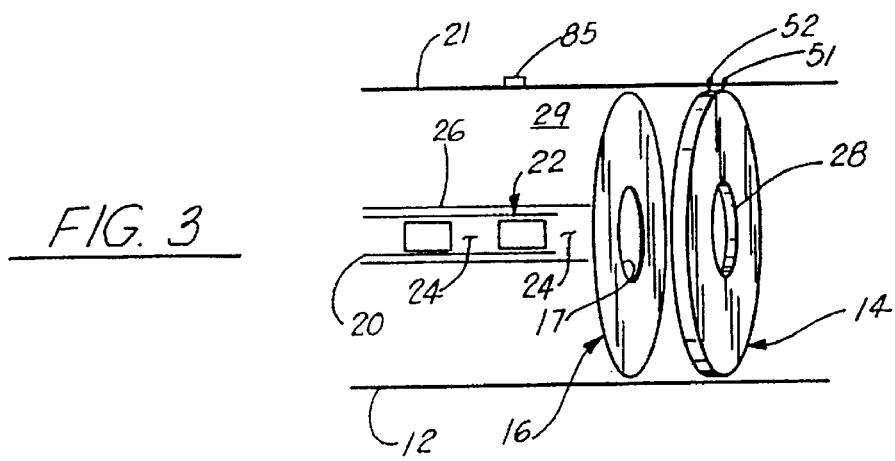
FIG. 3 is an exploded view of some magnets in the inner housing and a coil and plate within a portion of an outer housing of the embodiment of FIG. 1, illustrating the relationship between these various elements.
Figure 4:
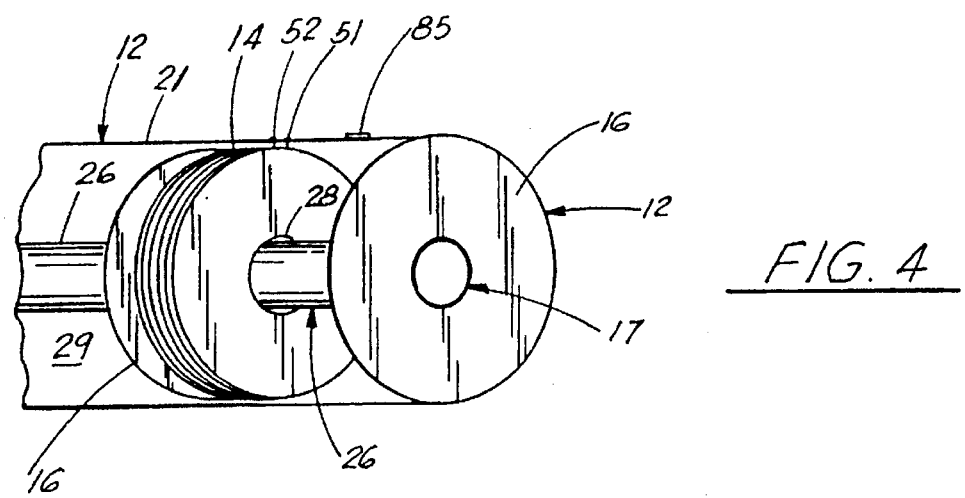
FIG. 4 is another exploded view of portions of the embodiment of FIG. 1, illustrating the relationship between its various elements.
Figure 5:
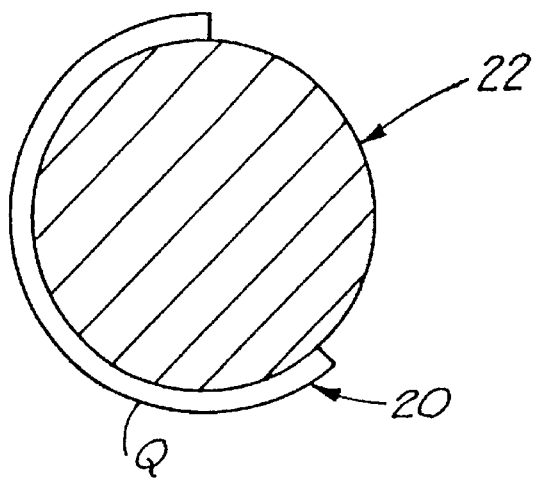
FIG. 5 is an enlarged view of the central portion of FIG. 2, the inner housing containing the magnets partially broken away.

Referring initially to FIGS. 1 and 3, there is shown electric generator 10 partially broken away. Electric generator 10 consists of a plurality of closely spaced, arcuate, non-magnetic, insulated outer housings 12 arranged so as to be shaped as a doughnut or a torus and each has a generally circular cross-section (best seen in FIG. 2). (In the preferred embodiment of FIG. 1, three (3) such outer housings 12a, 12b, 12c are depicted, however, two (2) or more may be provided so as to allow the application of support and drive means, to be described further herein). Each housing 12 is an arcuate cylinder having an insulated outer cover 21 sealed by end plates 16 which have a centrally located opening 28 and a concentric insulated inner arcuate cylinder 26. Thus, the area 29, between outer insulated cover 21 and inner cylinder 26 forms a sealed chamber 29. Each housing 12 is provided with a series of individual coil windings or coils 14 wound around cylinder 26, adjacent coil windings 14 in each housing 12 being separated by plates 16 each having a central bore 17 therein (end plates 16 need not be of a magnetic material; separation plates 16 between the coils are magnetic to "stretch" the flux line field). Generally, the cross-section of coils 14 will be slightly wedge, pie, or trapezoid shaped to snugly fit within chamber 29 of insulated cover 12.

Passing through the center of these coils 14 and thus bores 17 of plates 16, and concentric with central annular axis 18 of insulated housing 12, is continuously annular non-magnetic second housing 20. Housing 20 is configured in the shape of a torus and it contains a series of magnets 22 therein. These magnets 22 are separated from each other by a gap or spacing 24 so that they are not in physical contact with each other but instead are generally evenly spaced within housing 20 along axis 18 (spacers (not shown) can be used).

FIGS. 2–5 illustrate the spatial relationships of these various components with the addition of each insulated inner cylinder 26 of housing 12 along its length surrounding a portion of continuous second housing 20. As shown, each coil winding 14 and plate 16 are disc-shaped and have a central opening 28 therein through which insulated non-magnetic inner cylinder 26 is inserted. Generally, the size of central opening 28 and bore 17 would be the same for both coils 14 and plates 16, respectively, with opening 28 and bore 17 also being sized large enough for non-insulated second housing or cylinder 20 to freely pass or move therethrough.

It is preferable for opening 28 and bore 17 to not be too small otherwise their sizes might restrict the movement of cylinder 20 (and thus magnets 22) through coils 14 and plates 16. On the other hand, if opening 28 is too large, the efficiency of electric generator 10 will be reduced because the flux line field is not being used. Thus, the various magnets 22 within housing 20 move through the various coils 14 as continuous housing 20 moves through the array of coils 14 in spaced-apart housings 12.

Figure 6:
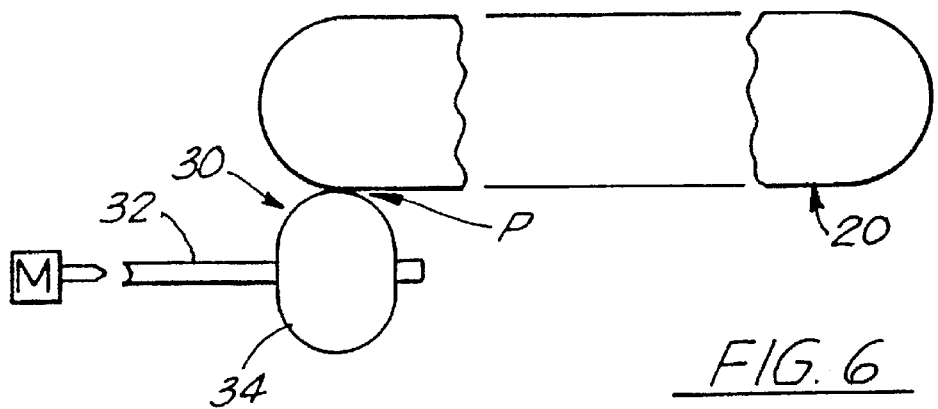
FIG. 6 is a side view of the embodiment of FIG. 1, which has been partially broken away, showing its drive means and manner of support.

FIG. 6 illustrates drive mechanism 30 which moves housing 20 along its arcuate path 18 and through outer housings 12. As indicated, drive mechanism 30 consists of a support or rod 32 secured at one end to a motor and secured at the other end to drive or gear or wheel 34. This drive or gear or wheel 34 engages the under side of housing 20 (holding magnets 22) at P and causes housing 20 to move. Preferably, drive 34 is a wheel which would cause housing 20 to rotate by the friction occurring between the two, but other methods of causing housing 20 to rotate are also possible (such as by gear teeth on drive 34 mating with continuous gear teeth on the underside of continuous housing 20 at areas designated P and Q in FIGS. 5 and 6). The speed at which drive mechanism 30 moves inner or second housing 20 through bore 17 is variable.

Figure 7:
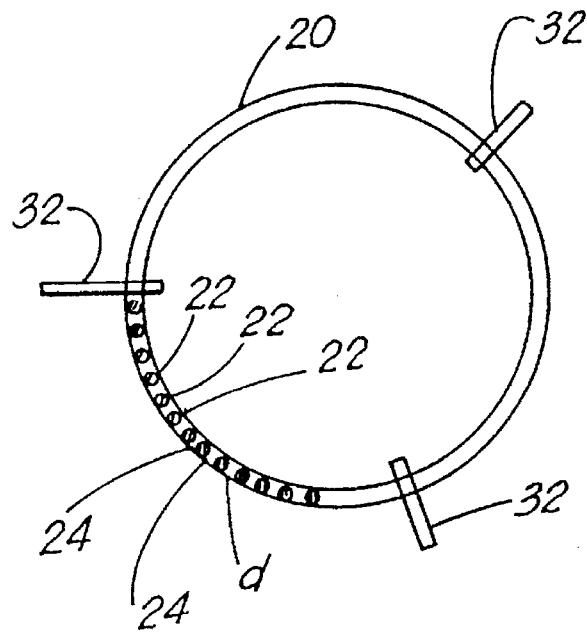
FIG. 7 is a top pictorial view of the embodiment of FIG. 1, illustrating its manner of support, the coils and insulated outer housing having been removed for clarity.
Figure 10:
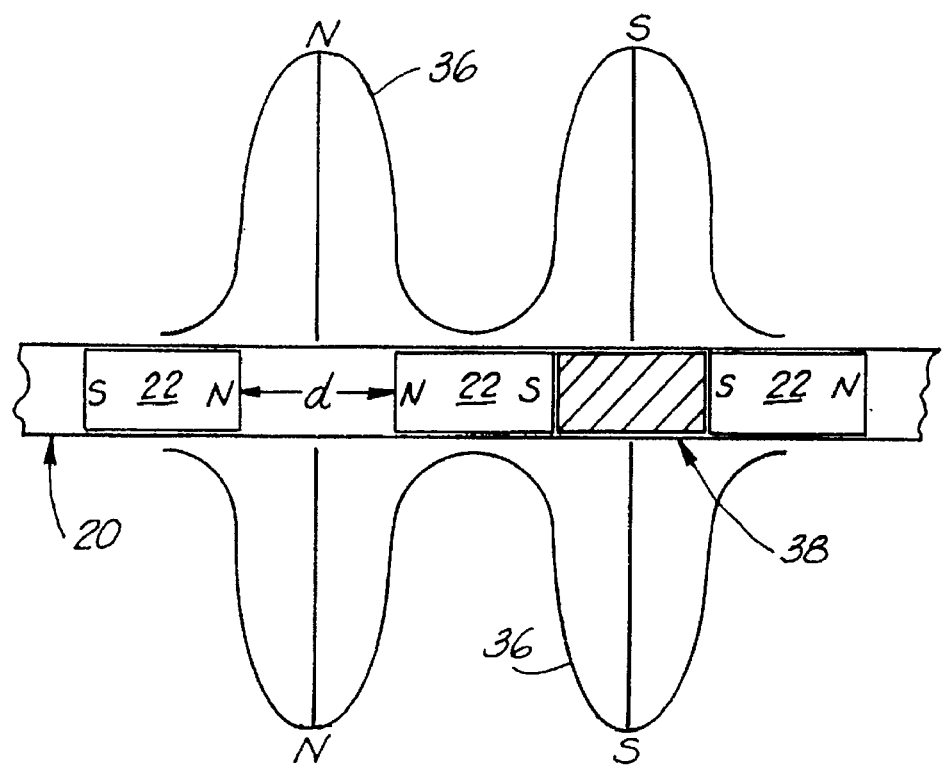
FIG. 10 is a pictorial side view of the flux line pattern created by the magnets of the embodiment of FIG. 1.

FIG. 7 illustrates the arrangement whereby three (3) drive mechanisms 30 are incorporated into electric generator 10 (one for each gap 13a, 13b, 13c separating housings 12a, 12b, 12c). These separate mechanisms 30 would generally be equally spaced about annular housing 20 as the three (3) outer housings 12 are of equal arcuate length. Of course, more or fewer such mechanisms 30 can be utilized as desired to cause magnets 22 to move along axis 18 if an equal number of housings 12 are provided—one for each gap. Alternatively, there could be only one drive mechanism 30 and as many supports 32 (free-turning wheel 34 with no motive force) as necessary. It is also possible for drive 34 to engage the top or sides of housing 20. Also, as stated above and as indicated in FIG. 3, 7 and 10, magnets 22 are generally evenly spaced (gap 24 or distance "d") along axis 18 and within housing 20. Magnetic tubing 38 can fill gaps "d" and may be constructed of a metallic material.

Figure 8:
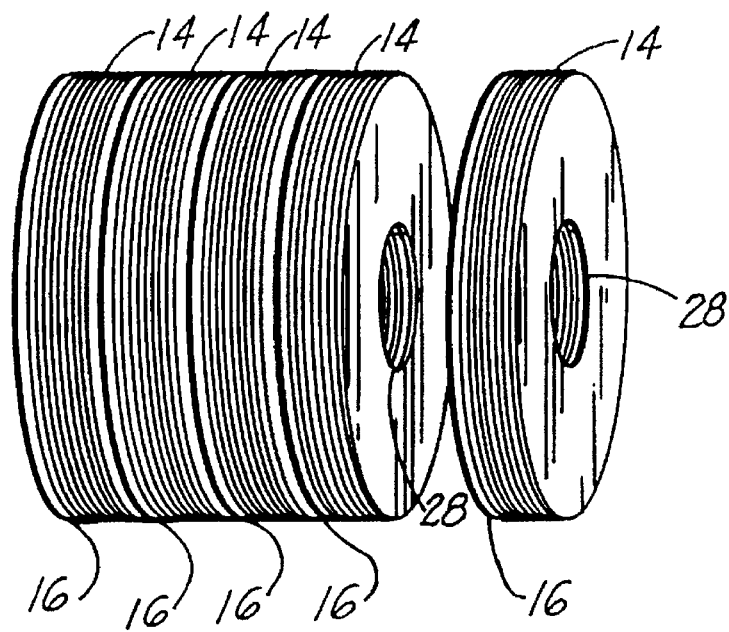
FIG. 8 is a pictorial view of the various coil windings of the embodiment of FIG. 1, showing adjacent coil windings as being separated by individual plates.
Figure 9:
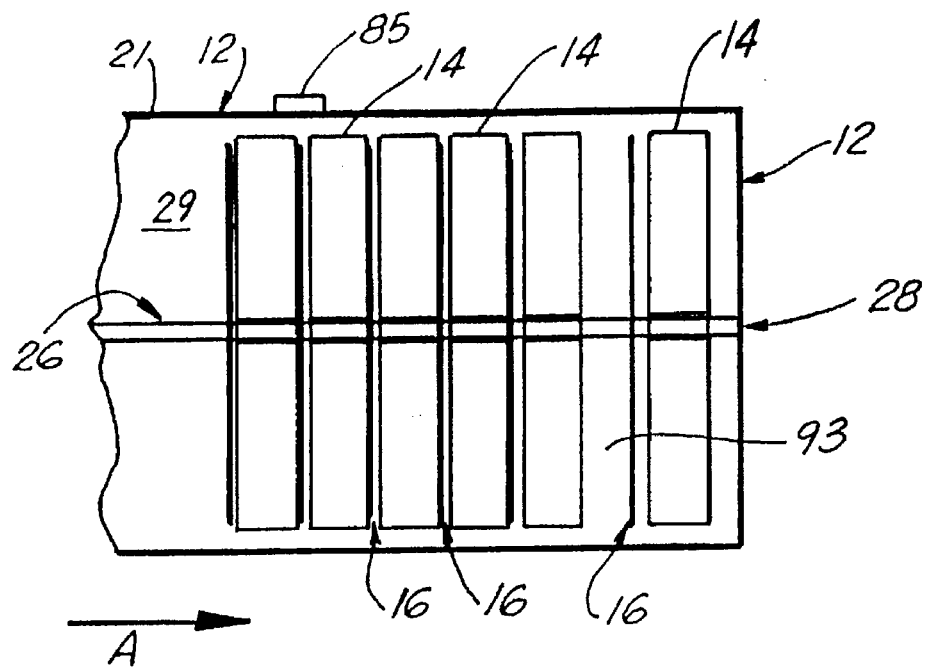
FIG. 9 is a pictorial view of the positioning of these individual coils of the embodiment of FIG. 1, within the insulated outer housing.

FIGS. 8 and 9 illustrate coils 14 and plates 16 in greater detail. Each coil 14 can be made from a single winding of a single continuous wire or each coil 14 can be made from the winding of several wires or from wire wrapped upon wire, whichever is desired. Also, while there would, of course, be leads 51, 52 from these various coils 14 (leads 51, 52 are as shown for illustration only). Furthermore, while it may seem that one coil 14 is illustrated as being spaced from adjacent coils 14, this is not the case, as in reality, the only spacing between adjacent coils 14 would be the thickness of intermediate plates 16.

Figure 11:
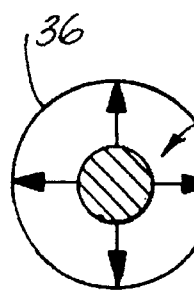
FIG. 11 is a pictorial end view of the flux line pattern of a typical magnet of the embodiment of FIG. 1; and, FIG. 12 is a pictorial end view of the flux line pattern of the magnets of the embodiment of FIG. 1, when they are arranged within the housing.
Figure 12:
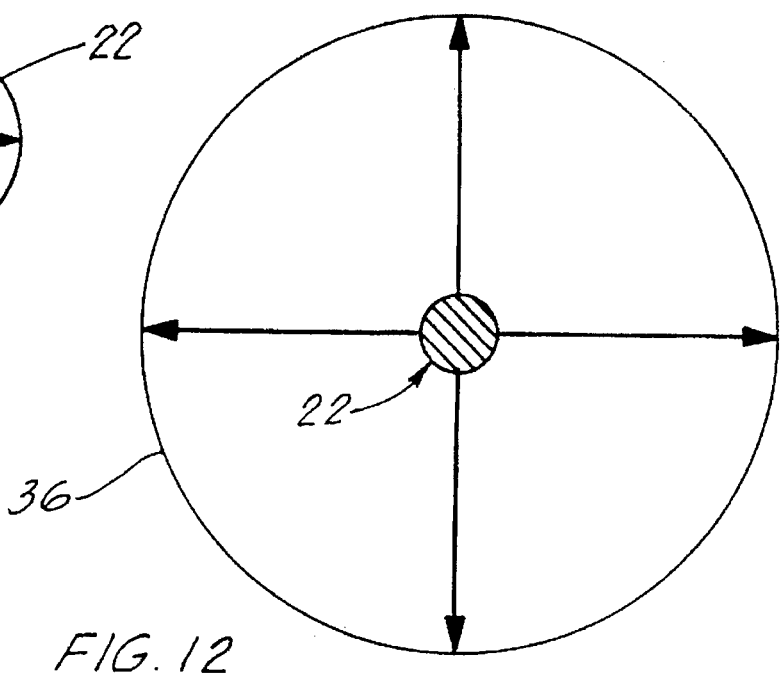

The operation of electric generator 10 relies upon the creation of a current whenever a magnet 22 is passed through a coil or coil winding 14. When the north pole of a magnet 22 enters a coil 14, the current flows in one direction and when the south pole of the same magnet 22 enters the same coil 14, the current flows in the opposite direction. Electric generator 10 utilizes this principle to create continuous current flowing by continuously passing magnets 22 in housing 20 and thus their flux lines through coils 14 in chambers 29 of housings 12. The movement of magnets 22 through the center of coils 14, as best illustrated in FIGS. 10–12, is made possible by supporting them within continuous annular housing 20 which is made of material that is not influenced by magnets 22. Thus, this circle of magnets 22 passing continuously through the center of coils 14 represents an endless supply of magnets continuously passing through a series of coils, thereby causing a continuous current to flow therethrough.

Referring now to FIGS. 10–12, for maximum effect, care must be given to the orientation of magnets 22 within continuous annular housing 20. This is because the position, density, and speed of annular flux lines 36 cause current flow. Should adjacent magnets 22 be spaced so far (distance "d") from each other that their respective flux lines 36 do not influence each other, then only a moderate to small current will flow. In this case, no distortion of the flux lines will have occurred and the current flow will be of limited magnitude since the spacing 24 between adjacent magnets 22 is larger which results in fewer magnets 22 per time period passing through coils 14. This will apply whether magnets 22 are all oriented in the same manner or whether their orientation varies. In other words, if the orientation of each magnet 22 is the same (i.e. N-S/N-S/N-S or S-N/S-N/S-N) only the north poles or only the south poles of each magnet 22 will first enter coils 14. But if their orientation varies (i.e. alternating N-S/S-N/N-S/S-N. . .) their respective north and south poles will alternate in first entering coils 14.

On the other hand, should the opposite poles of adjacent magnets 22 be spaced close enough (smaller "d") so as to influence each other (i.e. orientation is the same), flux field 36 is reduced to its smallest area and, therefore, the least amount of coil 14 is affected by such field 36. This produces the smallest amount of current flow.

However, when adjacent magnets 22 are placed with similar poles facing each other (i.e. orientation varies or alternates or N-S/S-N/N-S. . .) and close enough to influence each other (see, FIG. 10), flux field 36 is greatly enlarged. Since similar poles repel each other, by placing magnets 22 as illustrated in FIG. 10 (i.e. similar poles facing each other), each flux field 36 repels the other. This causes each such field 36 to extend radially outward in a 360° "smashed" or "flattened" pattern (of FIG. 10) since the respective fields 36 now abut each other. This creates a much larger area of usable flux, a larger polar field (n+n=2n), and the largest current flow.

A different output can be achieved by simply changing the orientation of magnets 22. In this case, alternating between the placement of similar poles adjacent each other and the placement of opposite poles adjacent each other (i.e. N-S/S-N/S-N/N-S. . .) will permit the respective magnetic fields to alternate from a large area (same poles facing each other) to the least area (opposite poles facing each). While this arrangement of magnets 22 will not result in the largest current flow or power output (see above), it does measure the largest voltage output.

Referring now to FIGS. 11 and 12, in order to increase or enlarge flux lines 36 of magnets 22 to their fullest potential, a plate 16 is inserted in front of each coil 14. Even though in this configuration plate 16 is now positioned between each pair of coils 14, it is important that plates 16 be at least positioned on the side of the coil that is approached by the magnets. This plate 16 is preferably constructed of a material that is influenced by magnets 22 or, in other words, a magnetic material. Plate 16, or any other configuration such as a rod or the like, which is influenced by the magnet will cause flux lines 36 to 'stretch' and become enlarged along a full 360°, thereby permitting a larger area of coils 14 to become energized. Also, as magnets 22 pass through plates 16, flux lines 36 are generally at a right angle to the coil 14 for maximum effect.

In accordance with electric generator 10, magnets 22 are positioned within annular housing 20 which itself is insulated from the surrounding coils 14 by inner cylinder 26. Housings 20 and thus magnets 22 are driven along the path defined by circular or annular axis 18 through cylinders 26 and thus through each wound coil 14 and plate 16 (through openings 28 and bore 17). This results in flux lines 36 of each magnet 22 passing through each coil 14 at a right angle. Thus, for maximum voltage and current flow (or for maximum power), a coil 14 is utilized which can make use of the expanded flux fields 36 of magnets 22. The larger the coil 14 the better; but if coil 14 exceeds the range of flux lines 36, then no additional benefit is achieved by using such larger coils. Consequently, the size of coil 14 is determined by the size of flux lines 36 of magnets 22.

Also, by inserting a tube 38 within each gap or spacing 24 (distance "d") between adjacent magnets 22 within housing 20, a stronger field is generated. Each tube 38 is preferably of a magnetic material (i.e. is influenced by magnet 22) and when it is so placed, it strengthens the two fields that oppose each other emanating from adjacent magnets 22. This results in a stronger flux line 36 that is passed through each coil 14, thereby resulting in a larger power output. Also, to keep weight down for driving or rotation purposes, tubes 38 are generally hollow.

As stated above, coils 14 are sized to make full use of the circular pattern of flux lines 36 emitted by magnets 22 as they pass therethrough. Additionally, the thickness of coils 14 are designed to use flux line 36 polarities to their best effect. Center opening 28 defined by winding in each coil 14 is sized to wrap around the inner insulated housing 26, with magnet housing 20 passing inside inner insulated housing 26, the closer the better. Also, in electric generator 10, many coils 14 are used in a side-by-side arrangement with their width being determined in some part by design considerations.

The driving speed of magnets 22 through openings 28 is directly related to the power output desired. The faster the speed of housing 20 containing magnets 22, the larger the power output. In electric generator 10, resembling a wheel, it is the number of flux lines 36 per time that is to be considered. Thus, for example, on a wheel having an 8 inch diameter (diameter of continuous housing 20), the RPM of magnets 22 therein would be twice that of a wheel having a diameter of 16 inches in order to provide the same power output per coil 14.

Consequently, in accordance with electric generator 10, its physical configuration can be varied depending on the power desired and the rotational speed imparted to magnets 22. Also, electric generator 10 makes it possible to encase coils 14 in a material that will allow cooling, such as by liquid nitrogen. Such coolant to be poured into chambers 29 at port 85a, 85b, 85c in FIGS. 1–4 and 9. Thus, coils 14 cool reducing the resistance of the coils. Such resistance of, say, a copper coil can be reduced by a factor of 10 or so with liquid nitrogen as a coolant. Thus, such cooling will also increase the power output of coils 14. The reduction of resistance within coil 14 without removing any coil wire will greatly increase the power output. This results in greater power since power equals current multiplied by voltage.

It should also be indicated that since magnets 22 have oppositely charged poles passing through coils 14, the current generated by coils 14 will be alternating current (A.C.) as contrasted with direct current (D.C.). Also, each coil 14 would generally be constructed of a single winding, but more that one such winding can be incorporated if that is desired. The actual winding design is a matter of choice with the wire ends or leads 51, 52 being the power takeoffs. Furthermore, coils 14 that are synchronized on the N-S sine wave due to their distance apart can be connected together in series or in parallel, whichever is needed.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An electric generator comprising:
   (a) a plurality of hollow, arcuately-shaped outer housings closely axially spaced apart to form a torus with spacing between adjacent said outer housings; each of said housings having a generally circular cross-section centered about a generally annular axis and comprising: concentric outer and inner arcuate cylinder members, and, proximate and distal end plates, said end plates having apertures therein, thus defining a sealed chamber between said cylinder members and a central bore through said housing;
   (b) a plurality of arcuately spaced-apart coils provided within each of said chambers, each of said coils being wound about said inner cylinder and therefore, about said annular axis of said housing and having leads passing through said outer cylinder of said outer housing;
   (c) a cylindrical separation plate positioned intermediate each pair of adjacent coils within said sealed chambers, said plates each having a central opening therein concentric with said annular axis;
   (d) a hollow annular inner housing, said inner housing extending continuously through said central bores in said spaced-apart outer housings, thus forming a ring along said annular axis;
   (e) a plurality of spaced-apart magnets provided within said inner housing; and,
   (f) means for driving said inner housing, and hence said magnets, through said central bores of said outer housings, thereby creating an electric field in said coils for the generation of current.

2. The electric generator as set forth in claim 1, wherein said plates are constructed of a magnetic material.

3. The electric generator as set forth in claim 1, wherein said inner insulating housing is constructed of a non-magnetic material.

4. The electric generator as set forth in claim 1, wherein said magnets are equally spaced within said inner housing.

5. The electric generator as set forth in claim 1, wherein adjacent magnets in said inner housing are separated by spacer members inserted therebetween.

6. The electric generator as set forth in claim 1, wherein said drive means is connected to said inner housing in the spacing between said outer housings.

7. The electric generator as set forth in claim 1, wherein said drive means moves said inner housing through said bore at variable speeds.

8. The electric generator as set forth in claim 7, wherein each said coil's leads are connected to an external power takeoff.

9. The electric generator as set forth in claim 8, wherein each of said coils has a thickness that is dependant on the spacing between adjacent said spaced-apart magnets.

10. The electric generator as set forth in claim 1, wherein said coils are cooled by a coolant provided within said chamber.

11. The electric generator as set forth in claim 10, wherein said coolant is liquid nitrogen.

12. The electric generator as set forth in claim 1, wherein said magnets are arranged having similar poles of said magnets adjacent each other.

13. The electric generator as set forth in claim 1, wherein a portion of said adjacent magnets are arranged having their opposite poles adjacent each other, with the remainder of said adjacent magnets being arranged having their similar poles adjacent each other.

14. An electric generator comprising:
   (a) a plurality of hollow, arcuately-shaped outer housing closely axially spaced-apart to form a torus with spacing between adjacent said outer housings; each of said housings having a generally circular cross-section centered about a generally annular axis and comprising: concentric outer and inner arcuate cylinder members, and, proximate and distal end plates, said end plates having apertures therein, thus defining a sealed chamber between said cylinder members and a central bore through said housing each of said chambers having a port for introduction of a coolant thereinto;
   (b) a plurality of arcuately spaced-apart coils provided within each of said chambers, each of said coils being wound about said inner cylinder and therefore, about said annular axis of said housing and having leads passing through said outer cylinder of said outer housing, such leads being connected to a power take-off;
   (c) a cylindrical separation plate positioned intermediate each pair of adjacent coils within said sealed chambers, said plates each having a central opening therein concentric with said annular axis;
   (d) a hollow annular inner housing, said inner housing extending continuously through said central bores in said spaced-apart outer housings thus forming a ring along said annular axis;
   (e) a plurality of spaced-apart magnets provided within said inner housing; and, (f) means for driving said inner housing, and hence said magnets, through said central bores of said outer housings, thereby creating an electric field in said coils for the generation of current, said means being connected to said inner housing in the spacing provided between said outer housings.

15. The electric generator as set forth in claim 14, wherein said plates are constructed of a magnetic material.

16. The electric generator as set forth in claim 14, wherein said inner housing is constructed of a non-magnetic material.

17. The electric generator as set forth in claim 14, wherein said magnets are equally spaced within said inner housing.

18. The electric generator as set forth in claim 17, wherein adjacent magnets in said inner housing are separated by spacer members inserted therebetween.

19. The electric generator as set forth in claim 18, wherein each of said coils has a thickness that is dependant on the spacing between adjacent said spaced-apart magnets.

20. The electric generator as set forth in claim 14, wherein said coolant is liquid nitrogen.

\* \* \* \* \*